Oct. 14, 1941. E. F. W. ALEXANDERSON Re. 21,919
ELECTRIC VALVE CIRCUIT
Original Filed Oct. 31, 1936
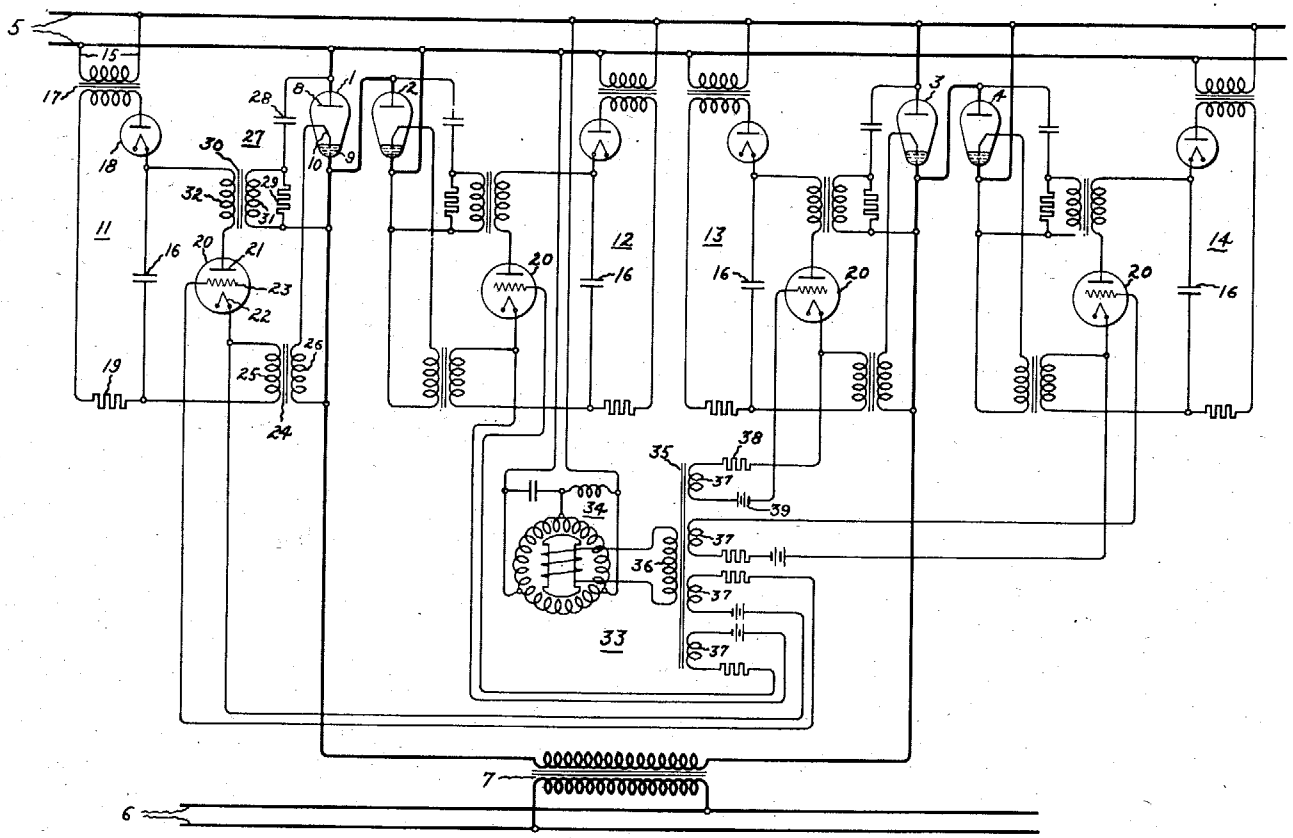
Inventor:
Ernst F. W. Alexanderson,
by Harry E. Dunham
His Attorney.

Reissued Oct. 14, 1941

Re. 21,919

UNITED STATES PATENT OFFICE 21,919

ELECTRIC VALVE CIRCUIT

Ernst F. W. Alexanderson, Schenectady, N. Y., assignor to General Electric Company, a corporation of New York Original No. 2,190,759, dated February 20, 1940, Serial No. 108,587, October 31, 1936. Application for reissue October 9, 1940, Serial No. 360,511

9 Claims. (Cl. 175—354)

My invention relates to electric valve circuits and more particularly to control and excitation circuits for electric discharge devices of the type employing ionizable mediums, such as gases or vapors.

In the control of electric discharge devices of the type employing ionizable mediums, such as gases or vapors, where the electric discharge is initiated by a control member associated with or in the vicinity of the arc path, it is frequently desirable to provide a control or excitation circuit which energizes the control member at predetermined points in the cycle of operation and which effects de-energization of the control member upon initiation of the arc discharge. This type of control is of particular importance in connection with the control of electric discharge devices having immersion-ignitor control members. These control members may be constructed of a semi-conducting material having a relatively large specific resistivity, and are arranged to have an extremity thereof in contact with, or submerged in the mercury of an associated mercury-pool cathode.

An object of my invention is to provide a new and improved control circuit for electric discharge devices.

Another object of my invention is to provide a new and improved excitation circuit for electric discharge devices of the type employing control members of the immersion-ignitor type.

In accordance with the illustrated embodiment of my invention, I provide a new and improved excitation circuit for controlling the energization of control members of electric discharge devices. Electric discharge devices of the type employing immersion-ignitor control members are connected in an electric translating circuit for transmitting energy between two alternating current circuits. A plurality of excitations are associated with the electric discharge devices to render the devices conductive during predetermined recurring intervals. The excitation circuits are connected to impress periodically on the immersion-ignitor control members suitable voltages to render the discharge devices conductive. Means are provided for introducing in the excitation circuits voltages to effect de-energization of the control members as soon as the electric discharges are initiated in the various devices.

For a better understanding of my invention, reference may be had to the following description taken in connection with the accompanying drawing, and its scope will be pointed out in the appended claims. The single figure of the accompanying drawing diagrammatically illustrates an embodiment of my invention as applied to an electric valve translating system for transmitting electrical energy between two alternating current circuits.

In the single figure of the accompanying drawing, my invention is diagrammatically illustrated as applied to control or excitation circuits for controlling electric valve means or electric discharge apparatus in an electric translating system. Electric valves 1–4, inclusive, are employed to transmit electrical energy between an alternating current circuit 5 and an alternating current circuit 6 through a transformer 7. For the purpose of explaining my invention, the electric discharge devices 1–4, inclusive, have been diagrammatically illustrated as being of the type employing ionizable mediums, such as gases or vapors, and including an anode 8, a mercury-pool cathode 9, and an associated control member 10 of the immersion-ignitor type. The immersion-ignitor control member 10 may be constructed of a semi-conducting material having a relatively large specific resistivity relative to the resistivity of the associated mercury-pool cathode 9. One extremity of the immersion-ignitor control member 10 may be placed in contact with the surface of the mercury-pool cathode 9 or may be submerged below the surface of the pool.

In order to control the conductivity of the electric discharge devices 1–4, inclusive, I employ a plurality of control or excitation circuits 11–14, inclusive. These excitation circuits render the electric discharge devices 1–4, inclusive, conductive in a predetermined order and permit these devices to conduct current during predetermined intervals. Each of the excitation circuits 11–14 includes a source of alternating current 15 which may be derived from the alternating current circuit 5. The excitation circuits 11–14, inclusive, are similar in construction and arrangement and for the purpose of facilitating the description thereof, one of the excitation circuits, for example, excitation circuit 11, will be considered in particular. A capacitance 16 is connected in the excitation circuit 11 and is arranged to be charged from the source of alternating current 15 through a transformer 17 and a suitable unidirectional conducting device such as an electric valve 18. A suitable impedance such as a resistance 19 may be connected in series relation with the secondary winding of transformer 17, the electric valve 18 and the capacitance 16 to control the rate at which the capacitance 16 is charged. An auxiliary or control electric discharge device 20, preferably of the type employing an ionizable medium and having an anode 21, a cathode 22 and a control member 23, is connected in the excitation circuit 11 to effect periodic discharge of capacitance 16 and hence to impress on the immersion-ignitor control member 10 of the associated electric discharge device 1 a transient positive potential of peaked wave form and of sufficient magnitude and duration to render the discharge device 1 conductive. This energization of the immersion-ignitor control member 10 is effected by means of a suitable inductive device, such as a transformer 24 having a primary winding 25 and a secondary winding 26 and which is energized in accordance with the periodic discharges of the capacitance 16. One terminal of the secondary winding 26 of transformer 24 is connected to the cathode 9 of the discharge device 1 and the other terminal of the secondary winding 26 is connected to the immersion-ignitor control member 10.

I provide means comprising a circuit 27 for controlling the excitation circuit 11 to effect de-energization of the immersion-ignitor 10 upon the initiation of an arc discharge in the arc discharge path of the device 1. The circuit 27 comprises a serially-connected reactive element such as a capacitance 28 and a resistance 29 connected between the anode 8 and the cathode 9 of electric discharge device 1 and which is responsive to the decay of voltage therebetween. A voltage which varies in accordance with the voltage appearing across the terminals of resistance 29 is introduced in the excitation circuit 11 through a suitable means such as a transformer 30 having a primary winding 31 and a secondary winding 32.

The control electric discharge devices 20 in excitation circuits 11–14, inclusive, are rendered conductive in a predetermined order by means of a control circuit 33. The control circuit 33 may be energized from any suitable source of alternating current such as the alternating current circuit 5 through any suitable phase shifting arrangement such as the rotary phase shifter 34. The output circuit of the rotary phase shifter 34 is connected to a primary winding 36 of a transformer 35 and serves to energize the transformer 35 and to control the phase of the potentials impressed on the control members 23 of electric discharge devices 20. Secondary windings 37 of transformer 35 are each associated with a different one of the electric discharge devices 20 in excitation circuits 11–14, inclusive, and each of these control circuits includes a current limiting resistance 38 and a suitable source of negative biasing potential such as a battery 39. The transformer 35 may be of the type designed to provide a voltage of peaked wave form.

The operation of the embodiment of my invention diagrammatically shown in the single figure of the accompanying drawing may be best explained by considering the electric valve translating system, when energy is being transmitted from the alternating current circuit 5 to the alternating current circuit 6 through the electric discharge devices 1–4, inclusive. As will be well understood by those skilled in the art, during half cycles of one polarity of the voltage of circuit 5, electric discharge devices 1 and 4 will be rendered conductive to transfer energy to the alternating current circuit 6, and during half cycles of the opposite polarity, electric discharge devices 2 and 3 will be rendered conductive to transmit energy to the alternating current circuit 6. Let it be assumed that the rotary phase shifter 34 is adjusted so that the potential impressed on the control members 23 of the control discharge devices 20 are retarded in phase relative to the potentials appearing between the anode 8 and cathode 9 of the associated electric discharge devices 1–4, inclusive. The excitation circuits 11–14, inclusive, will periodically effect energization of the immersion-ignitor control members 10 of the devices 1—4, to render these devices conductive in the normal predetermined manner.

Considering in particular the operation of the excitation circuit 11 associated with electric discharge device 1, the capacitance 16 will be charged from the source of alternating current 15 through the transformer 17, the electric valve 18, and resistance 19, during positive half cycles of the voltage of this source. At the time determined by the phase position of the voltage impressed on control member 23 of the control discharge device 20, the capacitance 16 will be discharged through a circuit including the secondary winding 32 of transformer 30, the electric discharge device 20, primary winding 25 of transformer 24, and the capacitance 16. The passage of this discharge current through the primary winding 25 of transformer 24 will impress on the immersion-ignitor control member 10 of the electric discharge device 1 a positive transient voltage of peaked wave form effecting energization of the control member 10 and rendering the electric device 1 conductive. That is, the discharge of the capacitance 16 through electric discharge device 20 and transformer 24 serves to effect energization of the immersion-ignitor control member 10 of electric valve 1 during a predetermined interval or portion of the cycle of voltage of circuit 5. Prior to the initiation of the arc discharge within the electric discharge device 1, the capacitance 28 in the circuit 27 will have been charged by virtue of the difference of potential existing between the anode 8 and the cathode 9 of the electric discharge device 1. The upper plate of the capacitance 28 will have accumulated a positive charge so that, upon initiation of the arc discharge within the electric discharge device 1, the capacitance 28 will discharge through a circuit including the anode 8, the associated arc discharge path, the cathode 9, the resistance 29 and the capacitance 28. The voltage appearing across the terminals of the resistance 29, and hence the voltage impressed across the primary winding 29 of transformer 30 will introduce in the excitation circuit 11 through the transformer 30 a voltage of the proper polarity to control the excitation circuit 11 and to render the control electric discharge device 20 nonconductive by impressing on the anode 21 of this device a voltage sufficiently negative to permit the control member 23 of this device to gain control. In this manner, the control member 10 of the electric discharge device 1 is de-energized as soon as an arc discharge is established in the device 1.

Although for the purposes of explaining my invention I have chosen to represent the system as applied to a system for transmitting energy between two alternating current circuits, it should be understood that my invention in its broadest aspects may be applied to electric valve translating systems generally where it is desired to transmit energy between alternating current and direct current circuits or between alternating current circuits of the same or different frequencies.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric discharge device having an arc discharge path and having an anode, a cathode and a control member of the immersion-ignitor type for initiating an arc discharge in said path, means tending to energize continuously said control member during a predetermined interval of a cycle of anode-cathode voltage, and means responsive to the decay of voltage across said path upon the initiation of an arc discharge therein for controlling said first-mentioned means to effect de-energization of said control member during said predetermined interval.

2. In combination, an electric discharge device having an arc discharge path and having an anode, a cathode and a control member of the immersion-ignitor type for initiating an arc discharge in said path, an excitation circuit tending to energize continuously said control member during a predetermined interval of a cycle of anode-cathode voltage, and reactive means responsive to the decay of voltage across said path for controlling said excitation circuit to de-energize said control member during said predetermined interval upon initiation of an arc discharge in said path.

3. In combination, an electric discharge device having an anode, a cathode, and a control member, an excitation circuit tending to energize continuously said control member during a predetermined interval of a cycle of anode-cathode voltage to initiate an arc discharge between said anode and said cathode, and means responsive to the decay of voltage between said anode and said cathode upon the initiation of an arc discharge therebetween to introduce in said excitation circuit a voltage to effect de-energization of said control member during said predetermined interval.

4. In combination, an electric discharge device having an anode, a cathode, and a control member of the immersion-ignitor type, an excitation circuit for impressing on said control member a voltage of substantially peaked wave form to render said device conductive during a predetermined interval of a cycle of anode-cathode voltage, and means comprising a reactive element responsive to the decay of voltage between said anode and said cathode for introducing in said excitation circuit a voltage to effect de-energization of said control member during said predetermined interval upon the initiation of an arc discharge in said device.

5. In combination, an electric discharge device having an anode, a cathode and a control member of the immersion-ignitor type, an excitation circuit for energizing said control member to render said device conductive, and means comprising a serially-connected reactive element and a resistance connected across said anode and said cathode for introducing in said excitation circuit a voltage to effect de-energization of said control member upon the initiation of an arc discharge in said device.

6. In combination, an electric discharge device having a control member, an excitation circuit including a source of alternating current, a capacitance connected to be charged from said source and a control electric discharge device for discharging said capacitance to effect energization of said control member, and means including a circuit for introducing in said excitation circuit a voltage to render said second-mentioned electric discharge device nonconductive and to effect de-energization of said control member upon the initiation of an arc discharge in said first-mentioned device.

7. In combination, an alternating current circuit, an electric discharge device connected thereto and having an anode, a cathode and an immersion-ignitor control member, an excitation circuit for energizing said control member to render said electric discharge device conductive comprising a source of alternating current, a capacitance connected to be charged from said source, a control electric discharge device for periodically discharging said capacitance and means responsive to the discharge of said capacitance for impressing on said control member a transient positive voltage, and means comprising a serially-connected capacitance and a resistance connected across aid anode and said cathode for introducing in said excitation circuit a voltage for controlling said excitation circuit to render said control electric discharge device nonconductive upon initiation of an arc discharge in said first-mentioned electric discharge device.

8. In combination, an electric discharge device having an anode, a cathode and a control member of the immersion-ignitor type, an excitation circuit to energize continuously said control member during a predetermined interval of a cycle of anode-cathode voltage to initiate an arc discharge between said anode and said cathode, and means responsive to an electrical condition of said discharge device occasioned by the initiation of an arc discharge betweten said anode and said cathode for effecting deenergization of said control member during said predetermined interval as soon as said arc discharge is established between said anode and cathode and comprising means connected between said electric discharge device and said excitation circuit for introducing therein a voltage to prevent transmission of current to said control member after the initiation of an arc discharge.

9. In combination, an electric discharge device having an anode, a cathode and a control member of the immersion-ignitor type, an excitation circuit tending to energize continuously said control member during a predetermined interval of a cycle of anode-cathode voltage to initiate an arc discharge between said anode and said cathode comprising means for supplying current to said control member, and means responsive to a predetermined electrical condition of said discharge device incident to the establishment of an arc discharge between said anode and said cathode for rendering said last mentioned means ineffective thereby effecting deenergization of said control member during said predetermined interval as soon as said arc discharge is established between said anode and cathode and comprising means connected between said electric discharge device and said excitation circuit for introducing therein a voltage to prevent transmission of current to said control member after the initiation of an arc discharge.

ERNST F. W. ALEXANDERSON.